(12) United States Patent
Hayden et al.

(10) Patent No.: US 8,277,768 B2
(45) Date of Patent: Oct. 2, 2012

(54) SYSTEM AND METHOD FOR PRODUCTION OF HIGH PURITY SILICON SOLIDS AND SOLIDS THEREFROM

(75) Inventors: Michael Louis Hayden, Plano, TX (US); Jeffrey Allen Hanson, Allen, TX (US); Keith Melcher, McKinney, TX (US); Robert Mark Reynolds, Richardson, TX (US); Patricia Ann Constandine, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 650 days.

(21) Appl. No.: 12/271,329

(22) Filed: Nov. 14, 2008

(65) Prior Publication Data

US 2010/0124527 A1 May 20, 2010

(51) Int. Cl.
*C01B 31/20* (2006.01)
(52) U.S. Cl. ........................................ 423/348; 423/338
(58) Field of Classification Search .................. 423/348, 423/324, 349
See application file for complete search history.

(56) References Cited

U.S. PATENT DOCUMENTS

| 4,388,080 | A | * | 6/1983 | Kapur et al. ................. 23/293 R |
| 6,010,010 | A | | 1/2000 | Heinle et al. |
| 6,162,361 | A | | 12/2000 | Adiga |
| 6,638,491 | B2 | * | 10/2003 | Carberry ....................... 423/348 |

FOREIGN PATENT DOCUMENTS

| JP | 05-213605 | 8/1993 |
| JP | 09-225937 | 9/1997 |
| JP | 2001-278612 | 10/2001 |
| JP | 2001278612 A1 * | 10/2001 |
| JP | 2003-225700 | 8/2003 |
| TW | 279393 B | 4/2007 |

OTHER PUBLICATIONS

WO 2008/053696 (ISR), Sharp Kabushiki Kaisha.
Alibaba.com Solar Grade Silicon Powder Scrap http://www.alibaba.com/product-free/100210883/Solar_Grade_Silicon_Powder_S . . . .

* cited by examiner

*Primary Examiner* — Stuart Hendrickson
*Assistant Examiner* — Richard M Rump
(74) *Attorney, Agent, or Firm* — Jacqueline J. Garner; Wade J. Brady, III; Frederick J. Telecky, Jr.

(57) ABSTRACT

Systems and methods and resulting compositions of matter including silicon solids from a mixture of silicon and water. The mixture is collected at a collection stage from at least one wafer abrasion process performed on a silicon surface having an impurity concentration $\leq 0.1$ ppb and extracting one portion of the water from the mixture using at least one dryer stage to form a dry cake. The dry cake includes at least 99.99% silicon by weight excluding water and non-silicon species, where a concentration of water in the dry cake is between 0.05% and 1% by weight, and where a concentration of non-silicon species in the dry cake is between 0.05% and 1% by weight.

11 Claims, 1 Drawing Sheet

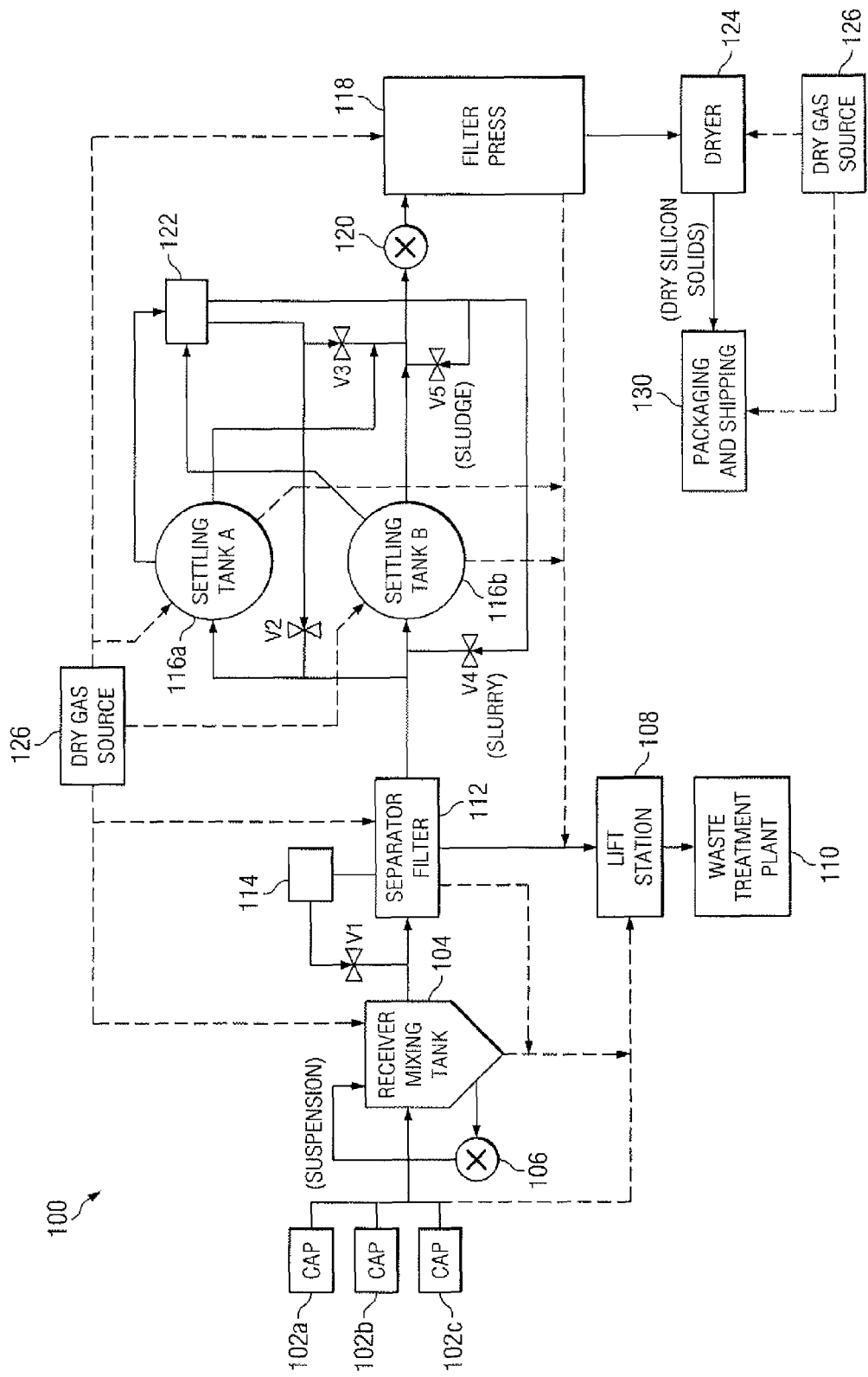

SYSTEM AND METHOD FOR PRODUCTION OF HIGH PURITY SILICON SOLIDS AND SOLIDS THEREFROM

FIELD OF THE INVENTION

The present invention relates generally to production of silicon solids and more particularly to systems and methods for producing a high purity silicon solids and solids therefrom.

BACKGROUND OF THE INVENTION

The foundation of semiconductor technology is currently based upon silicon which constitutes the primary semiconductor of the industry. Solar cell technology, a predominant alternate energy technology, also utilizes silicon as the predominant semiconductor material upon which the technology is based. Fortunately, silicon is one of the most abundant elements on earth. However, metallurgical grade silicon typically has an impurity content in excess of at least an order of magnitude too large for integrated circuit (IC) or solar cell applications. Therefore, in order to produce silicon of a suitable purity for solar cell or IC applications, expensive and complicated purification processes are typically required.

In the case of ICs, these additional purification costs are generally only a small fraction of the overall cost in manufacturing an IC. In contrast, because of the limited efficiency of solar cells, these purification costs are typically a more significant percentage of the overall cost. As a result, technical advances have been made to improve solar cell operational and fabrication efficiency. However, solar energy has been economically limited to remote areas and specialized applications.

SUMMARY OF THE INVENTION

This Summary is provided to comply with 37 C.F.R. §1.73, presenting a summary of the invention briefly indicating the nature and substance of the invention. It is submitted with the understanding that it will not be used to interpret or limit the scope or meaning of the claims.

The various embodiments of the present invention include systems and methods for producing high purity silicon solids and solids therefrom. In a first embodiment of the present invention, a method for producing high purity silicon solids is provided. The method can include collecting a mixture comprising silicon and water, the mixture collected from at least one wafer abrasion process performed on a silicon surface having an impurity concentration $\leq 1$ ppb. The method can also include extracting one portion of the water from the mixture using at least one dryer stage to form a dry cake. The dry cake can comprise at least 99.99% silicon by weight excluding water and non-silicon species, where a concentration of water in the dry cake is between 0.05% and 1% by weight, and where a concentration of non-silicon species in the dry cake is between 0.05% and 1% by weight.

In a second embodiment of the present invention, a system for producing silicon solids is provided. The system can include a collection system for collecting a mixture comprising silicon and water collected from at least one wafer abrasion process performed on a silicon surface having an impurity concentration $\leq 1$ ppb. The system can also include a dryer system for extracting a portion of the water from the mixture using at least one dryer stage to form a dry cake comprising at least 99.99% silicon by weight excluding water and non-silicon species, where a concentration of water in the dry cake is between 0.05% and 1% by weight, and where a concentration of non-silicon species in the dry cake is between 0.05% and 1% by weight.

In a third embodiment of the present invention, a composition of matter is provided. The composition of matter can be a mixture of water molecules, non-silicon species, and silicon solids, where the mixture comprises 99.99% silicon by weight excluding water and the non-silicon species, the water being present in the mixture in an amount between 0.05% and 1% by weight based on the total weight of the mixture, the non-silicon species being present in the mixture in an amount between 0.05% and 1% by weight based on the total weight of the mixture. In the mixture, the silicon solids comprise silicon particles and silicon agglomerates generally having a size between 0.5 microns and 15 cm.

DETAILED DESCRIPTION OF THE DRAWINGS

FIG. 1 is a schematic diagram of a system for performing a process for producing a composition of matter including high purity silicon solids from a mixture comprising silicon and water according to an embodiment of the present invention.

DETAILED DESCRIPTION

The present invention is described with reference to the attached FIGURE, wherein like reference numerals are used throughout the FIGURE to designate similar or equivalent elements. The FIGURE are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, one of the major costs in the fabrication of solar cells is the cost of starting materials. Typically, solar cells are fabricated from high purity silicon having a relatively low concentration of impurities ($\leq 1$ ppm). As previously described, metallurgical grade silicon typically has an impurity concentration substantially higher than this concentration and generally requires complex purification processes to reduce impurity concentrations to a level suitable for ICs and solar cells, Accordingly the costs associated with producing solar grade silicon and semiconductor grade silicon are not substantially different.

Typically, solar grade silicon is produced by combining various sources of silicon during the fabrication of solar grade silicon ingots. However, the Present Inventors note that the purity of the starting materials affects to cost and complexity of the process. For example, although at least some of the starting material for producing solar grade silicon ingots need not have solar grade purity, as the purity of the starting material is reduced, the more complex and costly the process becomes for fabrication of solar grade silicon ingots. Therefore, by providing a source of high purity silicon, both the costs and the complexity of the fabrication process can be significantly reduced.

Accordingly, some conventional solar grade ingot manufacturers may use silicon manufactured from scrap materials containing silicon obtained during solar device or IC fabrication processes. Such scrap materials generally include silicon produced from broken or damaged silicon wafers and ingots. However, such scrap materials may have been mishandled introducing a significant number of impurities. Furthermore, some of the scrap materials, such as silicon wafers, typically include broken wafers from multiple points in the solar cell or IC manufacturing process. As a result, many of these wafers may contain metals and other impurities intentionally added to the wafers. Although, several types of chemical removal processes are commonly used to reduce the concentration of such impurities, the amount of impurities, including metals, is typically >1.0% by weight in the silicon solids. As a result, such silicon solids are typically contaminated by metals and other impurities, resulting in a material that is only 98.5-99.9% by weight silicon. That is, the impurity concentrations are typically 1 part per thousand or worse. Accordingly, solar grade silicon manufacturers generally mix such low purity silicon material with higher purity silicon, or typically need to utilize more complex and costly purification processes to refine the low purity silicon materials.

However, the Present Inventors have discovered that a significant quantity of high purity silicon is regularly discarded during various conventional IC fabrication processes. In particular, during selected wafer abrasion processes, a significant amount of silicon is removed from semiconductor grade silicon surfaces, which generally have an impurity concentration significantly lower than that generally required for solar grade silicon ($\leqq 1$ ppb versus <1 ppm). The Present Inventors note that during such wafer abrasion processes, fluids are used for cooling and/or lubrication purposes. Accordingly, a significant amount of abraded silicon is typically suspended in such fluids, Therefore, the Present Inventors have discovered that these fluids can be a source of high purity silicon, including solar grade silicon. However, although many processes generate fluid mixtures comprising abraded silicon, these fluid mixtures also typically comprise a significant number of impurity atoms and molecules comprising non-silicon species. These non-silicon species can comprise silicon dopants, metals, dielectrics, cleaning chemicals, or other materials that are intentionally or unintentionally applied to silicon wafers during various semiconductor processes. In general such impurities are difficult to remove and typically require chemical processes, resulting in further contamination of the fluid and the silicon suspended therein.

The Present Inventors have discovered that during selected silicon abrasion steps, a relatively small concentration of impurities is introduced into the water and silicon comprising mixture. Therefore, embodiments of the present invention provide systems and processes for producing high purity silicon solids from the effluent resulting from selected abrasion processes. In particular, these selected abrasion processes include silicon abrasion processes applied to unprocessed or uncontaminated silicon surfaces using purified water, such as deionized water, as a coolant and/or lubricant. That is, abrasion of silicon surfaces essentially free of contaminants or other impurities. Such processes include, but are not limited to wafer slicing, wafer polishing, and wafer scribing. Afterwards, water can be extracted from the effluent resulting from these processes (a principally silicon and water mixture) to produce a mixture including high purity silicon solids. The mixture comprises 99.99% silicon by weight, excluding water and other impurities, versus 99.9% silicon by weight for conventional processes. The mixture can include between 0.5% and 1% water by weight and less than 1% other non-silicon species by weight. The silicon solids can vary in type and size. For example, the silicon solids can include single particles of silicon and groups of silicon particles adhering together (silicon agglomerates). The resulting size of these silicon solids can vary according to the filtering processes used. However, in the various embodiments of the present invention, the microfiltration processes used result in size range for silicon particles and agglomerates between at least 0.5 microns and 15 cm.

The Present Inventors have further discovered that even when such an effluent mixture is collected from the selected abrasion processes, the effluent mixture generally still requires some amount of careful handling to minimize the formation of silica. The term "silica", as used herein refers to silicon and oxygen compounds formed on a silicon surface, such at $SiO_2$ and other silicon oxides.

FIG. 1 is a schematic diagram of a system 100 for performing a process for producing a composition of matter including high purity silicon solids from a mixture comprising of deionized water and silicon according to an embodiment of the present invention. The process according to the various embodiments of the present invention utilizes a collection phase, at least one filtering phase, and at least one drying phase.

A. Collection Phase

In the various embodiments of the present invention, the process begins with the collection of a principally silicon and water comprising suspension mixture obtained from selected silicon abrasion processes. In particular, clean abrasion processes (CAPs). For example, as shown in FIG. 1, the mixture can be collected from one or more CAPs (102a-c) in at least one receiver mixing tank 104. The term "clean abrasion process" or "CAP" as used herein refers to silicon abrasion processes that generate a principally water and silicon comprising mixture in the form of a suspension. That is, a water and silicon mixture of 0.01% to 0.1% silicon by weight in deionized water. In some embodiments of the present invention, this concentration can vary less, such as between 0.03% and 0.05% silicon by weight in deionized water.

Once the suspension mixture is collected in the receiver mixing tank 104, the collected suspension mixture is mixed continuously to avoid settling of the silicon in the mixture tank 104. As shown in FIG. 1, one method of providing such mixing is a recirculation pump 106. However, the invention is not limited in this regard and other mixing techniques, such as the use of paddles to other mixing hardware, can be used alternatively or in combination with the recirculation pump. Accordingly, by continuously mixing the collected suspension mixture, silicon concentration throughout suspension mixture is kept generally between 0.01% and 0.1% by weight.

In some embodiments of the present invention, the CAPs 102a-102c and/or the receiver mixing tank 104 can be connected to a lift station 108 and a waste treatment plant 110 beyond. Therefore, in the maintenance for the system 100 or in case of overflow of the receiver mixing tank 104, the collected suspension mixture can simply be diverted to the waste treatment plant 110.

B. Filtration Phase

Once the suspension mixture is collected in the receiver mixing tank 104, filtration of the mixture can proceed over one or more filtration stages to reduce the amount of water in the mixture to below 5% by weight without the use of chemical reactions. Although a single filtration stage can be used to reduce the amount of water in the suspension mixture, the Present Inventors have found that performing the filtration over a plurality of stages (i.e., progressive filtering) can reduce maintenance requirements. That is, the use of multiple stages has been found to reduce the occurrence of filter clogging. Accordingly, the exemplary system 100 shown in FIG. 1 includes a first and second filtration stages. However, the present invention is not limited in this regard and additional filtration stages can be used to enhance the filtration efficiency and increase overall throughput.

In the exemplary system 100, the first filtration stage comprises a separator filter 112 for reducing an amount of water in the suspension mixture to between 90% and 99% by weight. Although various separation methods exist, the Present Inventors have found that a microfilter can be used in at least the first filtration stage to extract water from the suspension mixture to produce a slurry mixture without causing significant blockage of the filter and without introducing a significant number of impurities into the mixture. As used herein, a "microfilter" refers to a filter which removes contaminants from a fluid, liquid, or gas by passage through a microporous membrane. In general, a microfilter membrane pore size range is 0.1 to 10 microns. By way of example and not limitation, a generally adequate microfilter is a tubular membrane filter. In some embodiments of the present invention, as illustrated in FIG. 1, the water extracted by the separator filter 112 can then be diverted to the lift station 108 and the treatment plant 110 beyond. However, in other embodiments of the present invention, the extracted water can be recycled locally for reuse.

As shown in FIG. 1, the separator filter 112 can be coupled to the receiver mixing tank 104 via at least one valve V1. In some embodiments of the present invention, the valve V1 can be set at a fixed position to allow a fixed amount of flow between the receiver mixing tank 104 and the separator filter 112. In other embodiments of the present invention, the separator filter 112 can include a flow or level sensor to ensure a minimum amount of flow through the separator filter 112. In such embodiments of the present invention, the valve V1 can be coupled to the control sensor 114. The control sensor 114 can then be configured to automatically adjust a state of the control valve 114 as needed.

In some embodiments of the present invention, other portions of the separator filter 112 can also be connected to the lift station 108 and the waste treatment plant 110 beyond. Therefore, for maintenance for the separator filter 112, the suspension mixture in the receiver mixing tank 104 can simply be diverted to the waste treatment plant 110.

The slurry mixture can then be collected in one or more settling tanks 116a, 116b. The settling tanks 116a, 116b are used to permit at least a minimum amount of settling to occur to increase a concentration of silicon in at least a portion of the slurry mixture in the settling tanks to between 5% and 30% by weight, for example between 10% and 20% by weight. Therefore, a sludge mixture is formed in a portion of the settling tanks 116a and 116b.

The sludge mixture can then be placed through a second filtration stage to further reduce the concentration of water in the mixture to between 10% and 40% by weight. As shown in FIG. 1, the second filtration stage can comprise a filter press 118. The filter press 118 can receive an amount of a sludge mixture from at least one of the settling tanks 116a, 116b to produce a wet cake mixture. A wet cake mixture, as used herein refers to a packed mixture of silicon solids and water, where the water concentration is between 10 and 40% by weight. In general, any type of filter press can be used. For example, a plate-type filter press using a filter press cloth having a Frazier permeability between 0.1 and 4.0 scfm/ft$^2$ of air at a pressure drop of 0.5 inches of water column, such as between 0.5 and 2 scfm/ft$^2$, has been found by the inventors to be adequate for reducing the amount of water in the sludge mixture. Furthermore, the Present Inventors have found that a chemical pre-coat is not necessary, as a portion of the sludge mixture against the filter cloth remains as sludge mixture throughout the second filtration process and operates effectively as a pre-coat film for the filter press process. In some embodiments of the present invention, as illustrated in FIG. 1, the water extracted by the filter press 118 can then be diverted to the lift station 108 and the treatment plant 110 beyond.

In the various embodiments of the present invention, the sludge mixture can be transferred from the settling tanks 116a, 116b to the filter press 118 using a sludge pump 120. Although the sludge pump 120 can transfer sludge mixture from multiple settling tanks, throughput of the system 100 can be increased by pumping sludge mixture from a single settling tank. That is, rather than continuously pumping sludge mixture out of both of settling tanks 116a and 116b, the sludge mixture is pumped out of only one of settling tanks 116a, 116b at one time. This provides sufficient time for the sludge mixture to form in one of settling tanks 116a, 116b before pumping.

In some embodiments of the present invention, a settling tank control system 122 can be provided to select between the settling tanks 116a and 116b. The control system 122 can be configured to allow filling of one of the settling tanks with slurry mixture while sludge mixture is being pumped out of the other settling tank. As such, control system 122 can control valves V2 and V3 connected to settling tank 116a and control valves V4 and V5 connected to settling tank 116b. In operation, the control system 122 can shut valve V2 and open valve V3 to allow pumping from settling tank 116a. In the meantime valve V4 can be opened and valve V5 can be shut to allow slurry mixture to be added to settling tank 116b and to allow the sludge mixture to form. The control system 122 can also sense when an amount of slurry mixture has fallen below a threshold amount to trigger switch of settling tanks.

Although, simply allowing the slurry mixture to partially settle forms the sludge mixture, in some embodiments of the present invention, the amount of water in the sludge mixture can be controlled to ensure an adequate throughput. Therefore, in some embodiments of the present invention, the settling tanks 116a, 116b can be fitted with a recirculation pump (not shown) to limit the amount of settling. In other embodiments of the present invention, the amount of settling can be controlled by introducing water into the settling tanks 116a, 116b. Although a water source can be used, in some embodiments of the present invention, the water extracted from the filter press 118 can be diverted to the settling tanks 116a, 116b to reduce the amount of settling.

In some embodiments of the present invention, the settling tanks 116a, 116b, the sludge pump 120, and/or the filter press 118 can be connected to a lift station 108 and a waste treatment plant 110 beyond. Therefore, in the maintenance for the system 100 or in case of overflow of the settling tanks 116a, 116b, the slurry mixture or sludge mixture can be diverted to the waste treatment plant 110.

C. Drying Phase

Once the wet cake mixture has been formed in the filter press 118, the wet cake can be transferred to a dryer 124 for drying. In the various embodiments of the present invention, the dryer 124 comprises low temperature, low humidity drying system, operating at atmospheric pressures or higher, for reducing the amount of water in the wet cake mixture to form a dry cake having a water concentration between 0.05% and 1%. For example, a refrigerant dryer system can be used. In other embodiments of the present invention, a non-oxidizing gas purge, can also be provided for the dryer system by a dry gas source 126 connected to the dryer 124. As used herein, a non-oxidizing gas refers to a gas that is non-reactive with silicon. For example, nitrogen or argon can be used for the non-oxidizing gas purge.

The use of a non-oxidizing gas provides additional advantages over other drying methods. First, since drying can occur at atmospheric or higher pressures, a vacuum need not be established to extract the water, reducing complexity in operation of the drying system and handling of the wet cake mixture and the resulting dry cake. Second, purging using an inert gas increases the safety of the drying process. As one of ordinary skill in the art will recognize, silicon dust explosions are possible if silicon is stored for a period of time. In some embodiments of the present invention, the inert gas purging can also be applied to the receiver mixing lank 104, the separator filter 112, the settling tanks 116a and 116b, and the filter press 118 to further reduce the amount of oxygen the silicon in the mixture is exposed to.

Once the dry cake is formed in the dryer 124, the resulting dry silicon solids can be packaged at a packaging and shipping station 130. The Present Inventors have found that as a result of collection, filtering, and drying processes described herein, the resulting packaged silicon solids comprises 99.99% silicon by weight, excluding water and silica. Furthermore, the Present Inventors have discovered that resulting silicon solids also have moisture or water content between 0.05 and 1% by weight, a silica content of 0.05% and 1% by weight, and a content of other non-silicon species of $\leq 0.01\%$ by weight.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A method of producing a silicon solids from a mixture comprising silicon and water, the method comprising:
    collecting said mixture, said mixture collected from at least one wafer abrasion process performed on a silicon surface having an impurity concentration $\leq 1$ ppb;
    extracting one portion of said water from said mixture using at least one dryer stage to form a dry cake, said dry cake comprising at least 99.99% silicon by weight excluding water and silica, wherein a concentration of water in said dry cake is between 0.05% and 1% by weight, wherein a concentration of silica in said dry cake is between 0.05% and 1% by weight, and wherein a concentration of other non-silicon species in said dry cake is less than or equal to 0.01% by weight.

2. The method of claim 1, further comprising:
    prior to said extracting, removing another portion of said water from said mixture using a plurality of filtration stages to reduce a concentration of said water in said mixture to between 10% and 40% by weight.

3. The method of claim 2, wherein said extracting further comprises purging said dryer stage with at least one non-oxidizing gas.

4. The method of claim 3, wherein said non-oxidizing gas comprises nitrogen or argon.

5. The method of claim 2, wherein said plurality of filtration stages comprises at least a first filtration stage and at least a second filtration stage, and wherein said removing comprises:
    introducing said mixture into a receiver mixing tank;
    diverting a portion of said mixture in said receiver mixing tank to at least one settling tank through said first filtration stage;
    transferring a portion of said mixture in said settling tank into said second filtration stage.

6. The method of claim 5, wherein said second filtration stage comprises a plate-type filter press.

7. The method of claim 5, wherein said first filtration stage comprises a microfilter stage.

8. The method of claim 7, wherein said first filtration stage reduces a concentration of water in said mixture to between 90 and 99% by weight.

9. The method of claim 5, wherein said removing further comprises purging at least one among said receiver mixing tank, said settling tank, said first filtration stage, and said second filtration stage with a non-oxidizing gas.

10. The method of claim 1, wherein said mixture collected in said collecting step is a water and silicon mixture of 0.01% to 0.1% silicon by weight in deionized water.

11. A method of producing a silicon solids from a mixture principally comprising silicon and water, the method comprising:
    collecting said mixture, said mixture collected from at least one clean abrasion process performed on a silicon surface having an impurity concentration $\leq 1$ ppb;
    removing a first portion of said water from said mixture using a plurality of filtration stages to reduce a concentration of said water in said mixture to between 10% and 40% by weight; and
    extracting a second portion of said water from said mixture using at least one dryer stage to form a dry cake, said dry cake comprising at least 99.99% silicon by weight excluding water and silica, wherein a concentration of water in said dry cake is between 0.05% and 1% by weight, wherein a concentration of silica in said dry cake is between 0.05% and 1% by weight, and wherein a concentration of other non-silicon species in said dry cake is less than or equal to 0.01% by weight.

* * * * *